United States Patent
Van Sloun

(10) Patent No.: US 6,941,641 B2
(45) Date of Patent: Sep. 13, 2005

(54) METHOD FOR MOUNTING AN ARM TO AN ACTUATOR

(75) Inventor: Shane J. Van Sloun, Waconia, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 192 days.

(21) Appl. No.: 10/166,153

(22) Filed: Jun. 10, 2002

(65) Prior Publication Data

US 2002/0148102 A1 Oct. 17, 2002

Related U.S. Application Data

(62) Division of application No. 09/501,433, filed on Feb. 10, 2000, now Pat. No. 6,456,463.

(51) Int. Cl.[7] .......................... G11B 5/127; H04R 31/00
(52) U.S. Cl. ............................ 29/603.03; 29/603.07; 360/264.1; 360/264.3; 360/265.7; 360/265.9; 360/266.1; 360/266.2
(58) Field of Search ................... 29/592.1, 603.03, 29/603.07; 360/264.1, 264.3, 265.7, 265.9, 266.1, 266.2

(56) References Cited

U.S. PATENT DOCUMENTS

| | | | |
|---|---|---|---|
| 5,495,375 A | 2/1996 | Baasch et al. | 360/266.1 |
| 5,497,282 A * | 3/1996 | Hoffmann et al. | 360/244 |
| 5,631,789 A | 5/1997 | Dion et al. | 360/266.1 |
| 5,717,549 A | 2/1998 | Jurgeson et al. | 360/266.1 |
| 5,731,934 A | 3/1998 | Brooks et al. | 360/266.1 |
| 5,768,064 A | 6/1998 | Baasch et al. | 360/266.1 |
| 5,844,754 A | 12/1998 | Stefansky et al. | 360/266.1 |
| 5,862,019 A | 1/1999 | Larson | 360/265.8 |
| 5,924,187 A | 7/1999 | Matz | 29/603.3 |
| 5,966,269 A | 10/1999 | Marek et al. | 360/104 |
| 6,185,075 B1 | 2/2001 | Tsujino et al. | 360/265.7 |
| 6,236,544 B1 | 5/2001 | Hirokawa et al. | 360/266.1 |
| 6,456,463 B1 | 9/2002 | Van Sloun | 360/266.1 |

FOREIGN PATENT DOCUMENTS

| | | | |
|---|---|---|---|
| JP | 8-87841 | 4/1996 | |
| JP | 08203224 A * | 8/1996 | ........... G11B/21/02 |
| JP | 10003764 A * | 1/1998 | ........... G11B/21/16 |
| JP | 10144013 | 5/1998 | |

OTHER PUBLICATIONS

A novel suspension arm with 2–dimensional actuation, for flying height control and high–bandwidth "track following in advanced hard disk drives"; Chilumbu, C.; Clegg; W.; Jenkins, D.; Robinson, P.; May 1–4, 2000; pp. 562–566 vol. 2.*

"Dual stage actuators for high density rotating memory devices"; Guo, W.; Weerasooriya, S.; Goh, G.B.; Li, Q.H.; Bi, C.; Chang K.T.; Low, T.S.; Magnetics, IEEE Transactions on, vol.: 34, Issue: 2, Mar. 1998; pp. 450–455.*

Information Disclosure: Inventions; confidential information; Hutchinson Technology, Incorporated; 13 pages; Alternative Unamount Attachment, Code Name: Springer.

* cited by examiner

*Primary Examiner*—A. Dexter Tugbang
(74) *Attorney, Agent, or Firm*—Faegre & Benson LLP

(57) ABSTRACT

A method for mounting removably secured actuator arms that include head suspensions to an actuator assembly spindle. Each arm is mounted to an actuator spindle via a spacer with an annular lip with at least one detent formed into its perimeter edge. Each actuator arm includes two resilient fingers, annularly shaped to form an interior radius smaller than the spacer radius with at least one engagement member formed into a finger. Each arm is mounted by expanding the resilient fingers to a stressed state, engaging the fingers with the lip, and positioning the fingers so that each engagement member is aligned and engaged with a detent. The spacer alternatively includes a guide slot in a planar surface from which the lip extends, with the guide slot being engaged by a boss tower on the arm to properly orient the arm when mounting the arm to the spacer.

5 Claims, 8 Drawing Sheets

METHOD FOR MOUNTING AN ARM TO AN ACTUATOR

REFERENCE TO RELATED APPLICATION

This application is a division of application Ser. No. 09/501,433, filed on Feb. 10, 2000, now U.S. Pat. No. 6,456,463, which is hereby incorporated by reference in its entirety.

TECHNICAL FIELD

The present invention relates generally to an actuator assembly in an information storage device. In particular, the invention is an actuator assembly having an actuator arm mounted to a spacer of the actuator assembly.

BACKGROUND OF THE INVENTION

Information storage devices are in wide spread use, and are used to store and retrieve large amounts of data. Such information storage devices generally include a rigid media for storing information, a read/write device for creating and accessing the information, and an actuator assembly for positioning the read/write device over the rigid media. One common example of such an information storage device is a hard disk drive having one or more rotating magnetic disks, over a surface of each of which a head suspension and a head slider are positioned. Each of the head suspensions is attached to an actuator arm of the actuator assembly, and the actuator assembly thus positions the suspensions and sliders at a desired location over the rotating disks.

A conventional actuator assembly in a hard disk drive includes an actuator block, one or more arms extending from the actuator block, and a plurality of head suspensions that are mounted to the arms of the actuator block. The actuator block and arms extending from the block are typically machined from a single piece of starting material, such as aluminum, and are typically referred to as an E-block. The number of arms on the E-block and the number of head suspensions in the actuator assembly are usually dependent on the number of disks in the disk drive, with a head suspension positioned over each magnetic surface of the individual disks. Each head suspension is typically mounted to an arm of the E-block by swaging or ball staking a vertical swage boss extending from a base plate on an end of the head suspension to the arm. In this method, the swage boss is inserted in a hole in the arm and is then deformed to engage the arm by forcing a round ball through the boss. The E-block is coupled to a rotary actuator within the disk drive, and in this manner, the head suspensions can be positioned over a desired location of the disks.

E-blocks having suspensions mounted to the arms of the block have certain disadvantages, however. Increased spacing between the suspensions is typically required to accommodate the height of the vertical swage boss. In addition, a large vertical force must be used to swage the boss to the actuator arm, which can warp or otherwise permanently deform the actuator assembly. Suspensions that are swaged to the actuator block also cannot easily be selectively reworked or replaced due to the nature of the swaging process.

In recent years, integral arms comprising an actuator arm and a head suspension have been introduced into the disk drive industry to address these disadvantages. In such an embodiment, a head suspension is formed integral with an actuator arm from a single piece of material, and the integral arm is mounted to an actuator spindle, such as for example by inserting the spindle through an aperture at a proximal end of the integral arm. The spindle is coupled to an actuator, and the actuator positions the integral arm over a desired location of a disk. Because the suspension is formed integral with the actuator arm, an integral arm does not require additional spacing for a swage boss tower, and the arm is not deformed by the large forces required to swage the suspension to the arm. An integral arm also typically has less mass and inertia than an E-block/head suspension combination, which can increase the response time for positioning the head suspension over the disk.

Actuator assemblies can be formed having a stacked array of integral arms to access data stored on a plurality of disks within an information storage device. In such a stacked array, a spindle is inserted through the aperture of a bottom integral arm, and a spacer is placed over the spindle. A stacked array can be formed by placing the aperture of a second arm over the spindle, and a third arm can be placed back-to-back with the second arm in a similar fashion. A spacer can be inserted between the second and third arms if desired, and additional arms and spacers can be added to the spindle as necessary for a specific application. After the desired number of arms are inserted over the spindle, a washer and lock nut can be placed on the spindle and tightened to provide an axial compressive force that frictionally secures the arms and spacers to the actuator spindle.

One shortcoming of an actuator assembly having such a stacked array is that, should one or more of the head suspensions on the arms fail, it is cumbersome to replace the arm having the failed suspension. That is, unless the failed arm is at the very top of the stacked array, the array must be disassembled down to the level of the failed arm, the arm replaced, and then the stacked array reassembled by inserting the arms and spacers over the actuator spindle, and then re-engaging the washer and lock nut to secure the arms and spacers.

Attempts have been made to allow individual arm/suspension combinations to be replaced without disassembling an entire stacked array through the use of spring arm mounts between the arms and the actuator spindle of an actuator assembly. For example, in U.S. Pat. No. 5,631,789, issued May 20, 1997 to Dion et al., a pair of spring-like fingers of an actuator arm are used to clamp the arm to the housing of a bearing assembly. The housing of the bearing assembly is machined to have an annular groove that receives the spring-like arms of an individual actuator arm.

The attachment structure of the '789 reference, however, suffers certain shortcomings. For example, while it is possible to selectively rework an individual actuator arm having a head suspension attached thereto without disassembling the stacked array, it can be difficult to grasp the individual actuator arm due to the relatively close spacing between arms, and damage to surrounding arms and/or suspensions can result. This problem is exacerbated by the general industry trend toward smaller storage devices, which further reduces the room between individual arms and suspensions, making it more difficult to grasp the arms.

Moreover, it is important that the individual arms of the actuator assembly be positioned at the appropriate height (commonly referred to as the Z-height) above an associated disk in the information storage device. In this regard, the arms must be mounted to the actuator spindle at the appropriate location. The location of the arms on the spindle is driven by the position of the grooves that are engaged by the spring arms of the arm/suspension combinations. Manufacturing tolerances on the machining of the grooves can, however, introduce errors into the Z-height of the arm/suspension components.

There is therefore a continuing need for an actuator assembly having a mount for individual head suspensions. Such an improved assembly should securely hold head suspensions in place as the actuator rotates, and should permit the selective rework or replacement of head suspensions, while reducing the potential for damage to other head suspensions in a stacked array. An actuator assembly that provides accurate Z-height spacing of the head suspensions while also reducing the spacing between individual head suspensions would also be highly desirable.

SUMMARY OF THE INVENTION

The present invention is an actuator assembly for supporting a read/write device in an information storage device. In one embodiment, the present invention is an actuator assembly for use in a disk drive. The actuator assembly comprises a spindle that is adapted to be mounted to an actuator in the disk drive and a spacer mounted to the spindle. The spacer includes a flange having a first planar surface, an opposite second planar surface, and an aperture extending between the first planar surface and the second planar surface. The spacer is mounted to the spindle by inserting the spindle through the aperture. The spacer further includes a lip extending from the first planar surface and surrounding the aperture of the spacer. The actuator assembly also includes an arm having a proximal end and a mounting region at the proximal end of the arm. The mounting region of the arm has first and second opposite fingers, with an opening being defined between the first and second fingers. The arm is mounted to the spacer by expanding the first and second fingers from a neutral state into a stressed state and engaging the first and second fingers with the lip of the spacer. The first and second fingers can be shaped to substantially coincide with the shape of the lip of the spacer so that the fingers engage the lip substantially along the length of the fingers when the first and second fingers are expanded into the stressed state and engaged with the lip of the spacer. In one embodiment, the lip of the spacer includes a first detent formed in the perimeter of the lip, and one of the first and second fingers includes an engagement member at the end of the finger. The engagement member engages and interlocks with the first detent of the lip of the spacer. The lip can also include a second detent formed in the perimeter of the lip, with the other of the first and second fingers including an engagement member that engages the second detent of the lip of the spacer.

In a second embodiment, the present invention is a disk drive having at least one disk rotatably mounted to a motor, a voice coil motor, an actuator coupled to the voice coil motor, and an actuator assembly coupled to the actuator. The actuator assembly includes a spindle mounted to the actuator and a first spacer mounted to the spindle. The first spacer includes a flange having a first planar surface and an opposite planar surface. An aperture extends between the first and second planar surfaces, and the spindle is inserted through the aperture. A lip extends from the first planar surface and surrounds the aperture of the spacer. A first arm is mounted to the spacer, with the arm having first and second resilient fingers at the proximal end of the arm mounted to the lip of the spacer. In one embodiment, the lip of the spacer is annularly shaped and has a first radius. The lip includes a first detent formed in the perimeter edge of the lip. The first and second fingers are curved so that the opening between the fingers is annularly shaped having a second radius that is less than the first radius of the annular lip. One of the first and second fingers includes an engagement member on the proximal tip of the finger that engages and interlocks with the first detent on the lip of the spacer. The lip can also include a second detent, and the other of the first and second fingers can include an engagement member at its proximal tip that engages and interlocks the second detent of the lip.

In a third embodiment, the present invention provides a method for mounting an arm to a spindle in an actuator assembly. The method includes providing an actuator assembly having a spacer and an arm, the arm having first and second resilient fingers at a proximal end of the arm. The fingers define an opening between them. The first and second resilient fingers are expanded from a neutral state to a stressed state, and are engaged with the spacer to mount the arm to the spacer. The spacer can include a lip that extends from a planar surface of the spacer, and the step of engaging the first and second fingers with the spacer includes receiving the lip of the spacer within the opening between the fingers and engaging the fingers with the lip of the spacer.

DETAILED DESCRIPTION OF THE PREFERRED EMBODIMENTS

Figure 1:
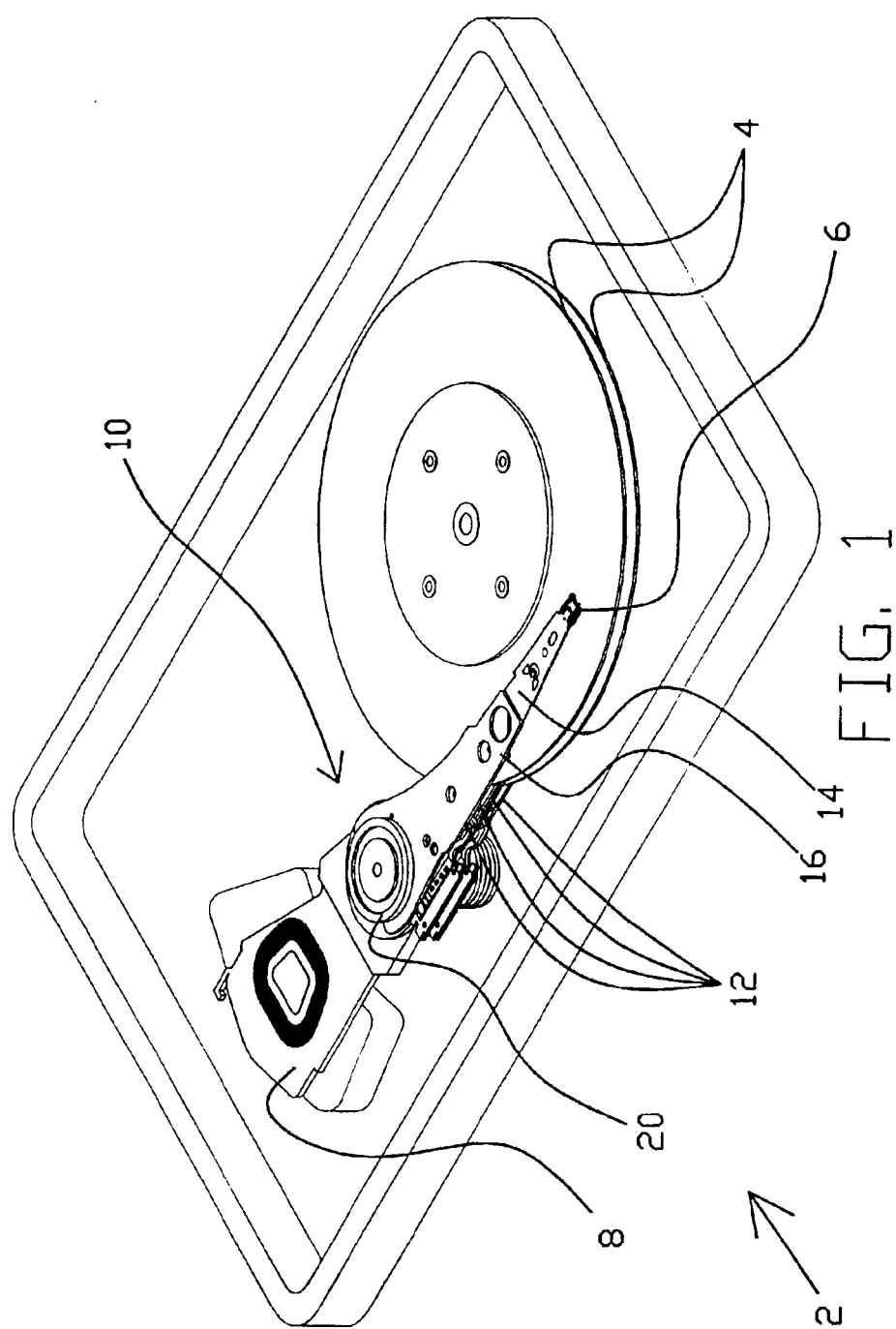
FIG. 1 is an isometric view of a disk drive having an actuator assembly that positions a stacked array of actuator arms and head suspensions over the disks of the drive in accordance with the present invention.

Referring now to FIG. 1, a disk drive 2 having a plurality of magnetic disks 4 is shown. Disk drive 2 includes an actuator assembly 10 that positions a plurality of magnetic heads 6 over the disks to read data from the disks and to write data to the disks. Typically, a single head 6 is positioned over an individual surface of each of the disks 4, and thus each disk 4 will have a pair of heads 6 associated with the disk. Actuator assembly 10 is coupled to a voice coil motor 8 that rotates assembly 10 in response to commands received by the voice coil motor by a microprocessor (not shown). In this manner, the actuator assembly 10 positions the heads 6 over a desired location of disks 4.

More specifically, actuator assembly 10 includes a stacked array of arms 12, with each arm 12 supporting one of the plurality of heads 6. Each arm 12 includes a head suspension 14 and an actuator arm 16. The head 6 is mounted to a distal end of the head suspension 14, and head suspension 14 provides the appropriate compliances necessary for the proper orientation of the head 6 over disk 4 during operation of the disk drive 2. The proximal end of each head suspension 14 is attached to the distal end of an actuator arm 16. In the embodiment shown in FIGS. 2–6, arm 12 is comprised of a head suspension 14 that is formed separately from an actuator arm 16, with the head suspension 14 being mounted to actuator arm 16 using known techniques, such as ball staking, swaging, welding, or gluing. Alternatively, arm 12 can be an integral arm that comprises a head suspension that is formed integral with an actuator arm from a single piece of material. Arm 12 also includes a conductive circuit 15 that extends along the length of actuator arm 16 and head suspension 14, and is electrically coupled to head 6 supported by suspension 14 to convey electrical signals to and from the head 6 to the microprocessor of the disk drive 2.

Each arm 12 is attached to a spindle 20 of actuator assembly 10 to form a stacked array of arms 12, and spindle 20 is coupled to the voice coil motor 8 of disk drive 2. As perhaps best shown in FIG. 2, the stacked array of actuator assembly 10 is comprised of a plurality of spacers 30 and arms 12 that are arranged in a desired manner over spindle 20. Each arm 12 is attached to a spacer 30, and the spacers 30 are attached to spindle 20 in a known manner. For example, in the embodiment shown, spindle 20 includes a flange 19 at a top portion of the spindle and a threaded portion 21 at a bottom end of the spindle 20. The length of the spindle 20 is chosen so that the stacked array extends between the flange 19 and threaded portion 21. Once the spacers 30 and arms 12 have been arranged over spindle 20 (described in more detail below), a washer 17 and nut 18 are inserted over threaded portion 21 of spindle 20. The nut 18 is tightened to provide a compressive force along the axis of spindle 20. In this manner, the stacked array is frictionally coupled to spindle 20.

Figure 2:
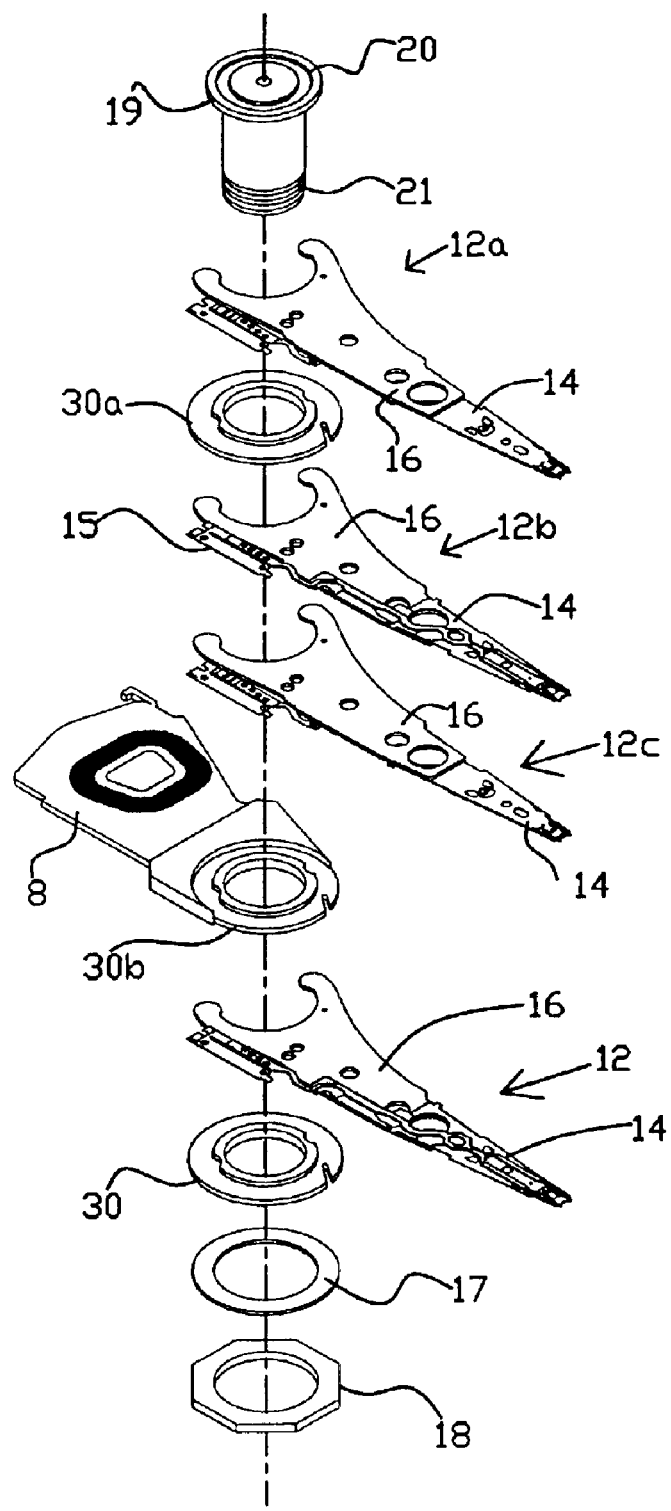
FIG. 2 is an isometric exploded view of the actuator assembly from the hard disk drive of FIG. 1 having a stacked array of arms in accordance with the present invention.

In the embodiment of FIG. 2, and as shown in greater detail in FIGS. 3–6, a desired number of arms 12 and spacers 30 are provided so that each one of the stacked array of arms 12 of actuator assembly 10 is mounted to a spacer 30. In particular, as viewed from the top of the actuator assembly 10 in the embodiment of FIG. 2, a first arm 12a at the top of assembly 10 is mounted to a first spacer 30a. First spacer 30a is positioned beneath first arm 12a and above a second arm 12b and a third arm 12c. The second and third arms 12b and 12c, respectively, are mounted to a second spacer 30b positioned beneath the third arm 12c. That is, the second spacer 30b is sized to accommodate the mounting of both the second arm 12b and the third arm 12c to spacer 30b. Additional arms and spacers can be added until the desired number of arms have been provided in the stacked array of actuator assembly 10.

As described above, each disk of a disk drive typically has a pair of heads, and thus arms 12, associated with the disk to position one head over each of the two magnetic surfaces (i.e. the top and the bottom) of the disks. Arm 12 thus has a bottom surface that faces a disk and a top surface opposite bottom surface that faces a top surface of an adjacent arm in the stacked array. In the embodiment of FIG. 2, for example, the first arm 12a and the second arm 12b are arranged to position the head suspensions associated with each arm over a disk (not shown) interposed between first arm 12a and second arm 12b. In forming the stacked array, then, the orientation of each arm 12 (i.e. either upside down or right side up) is controlled to properly position the bottom surface of each arm 12 over an associated disk of the disk drive.

Figure 3:
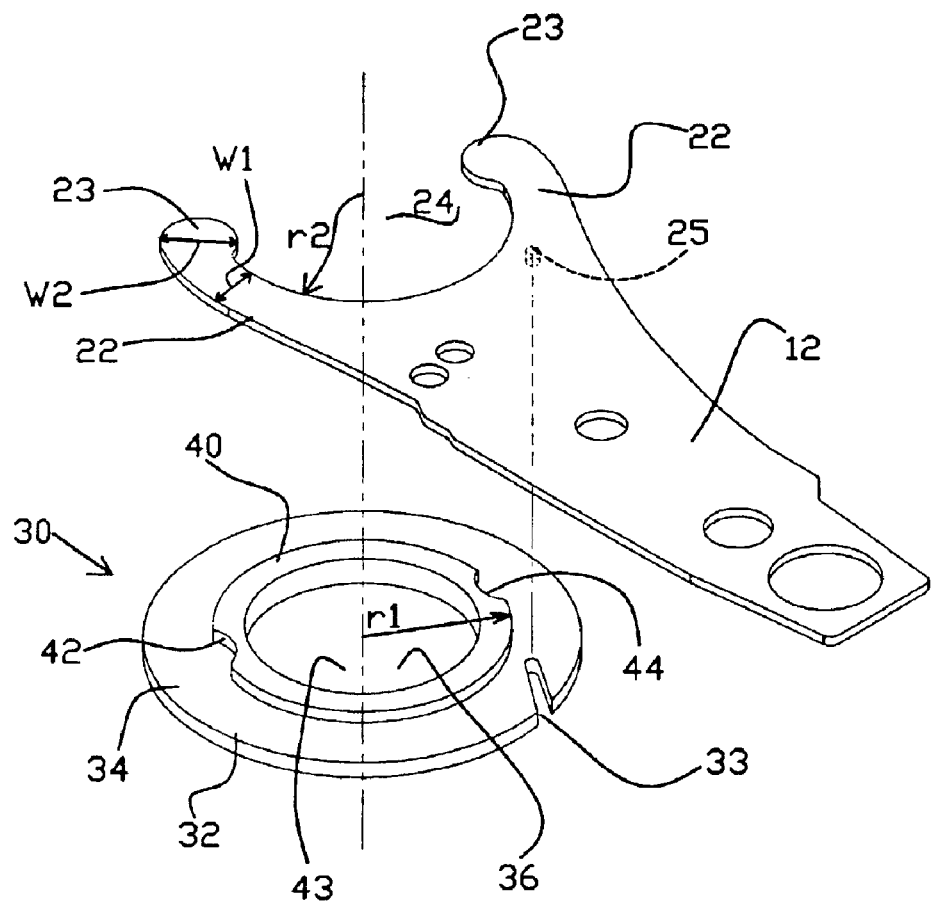
FIG. 3 is an isometric exploded view of a portion of the stacked array of FIG. 1 showing a spacer and one arm in greater detail.
Figure 4:
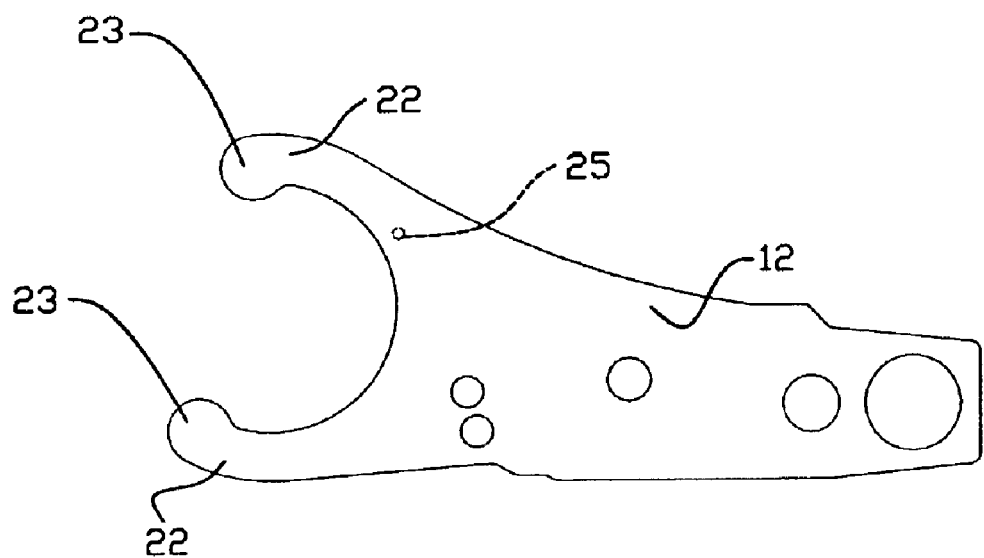
FIG. 4 is a top plan view of an arm of the present invention.
Figure 5:
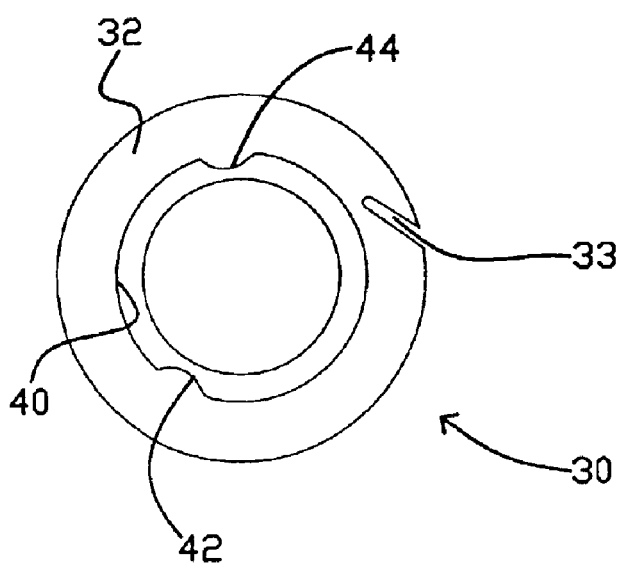
FIG. 5 is a top plan view of a spacer of the actuator assembly of the present invention.
Figure 6:
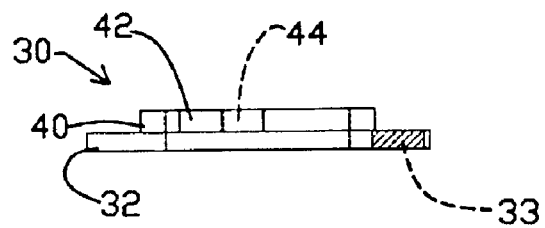
FIG. 6 is a side view of the spacer of FIG. 5.
Figure 7:
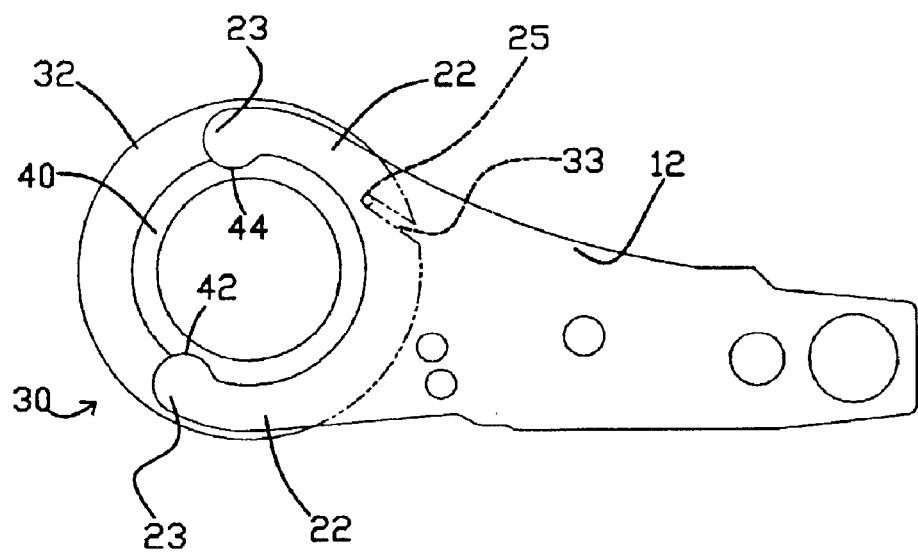
FIG. 7 is a top plan view of the arm of FIG. 4 mounted to the spacer of FIG. 5.

Spacer 30 is constructed to permit each arm 12 to be removably mounted to spacer 30, and the spacer 30 is shown in more detail in FIGS. 3 and 5–6. Spacer 30 includes a flange 32 having a planar surface 34 and a lip 40 extending from the planar surface 34. Spacer 30 further includes an aperture 36 that extends through flange 32, and lip 40 is sized and positioned to surround the aperture 36 of spacer 30. In this manner, lip 40 includes an aperture 43 that is concentric with aperture 36 extending through flange 32. The apertures 36 and 43 are preferably sized and shaped to coincide with the size and shape of the spindle 20, and in arranging spacers 30 over spindle 20, the spindle 20 is inserted into and through the apertures 36 and 43 of spacer 30. Lip 40 of spacer 30 is preferably formed integral with the flange 32, with the aperture 43 through lip 40 and aperture 36 through flange 32 being formed using known techniques, such as stamping, screw machining, or machining. Alternatively lip 40 can be separately formed from flange 32 and mounted to flange 32 using known techniques, such as with adhesive, by laser welding, or inertia welding.

In the embodiment shown, the proximal end of each arm 12 includes a pair of fingers 22 that define an opening 24 between the fingers 22. At least one of the fingers 22 is sufficiently resilient to permit the opening 24 to be expanded to receive the spacer 30 in the opening 24. That is, by providing at least one resilient finger 22, the pair of fingers 22 can be stressed from a neutral state to a first stressed state by expanding fingers 22. When in its stressed state, the fingers 22 are positioned so that the opening 24 receives lip 40 of spacer 30 with the fingers 22 positioned adjacent to lip 40 to engage the spacer 30 while remaining in the stressed state. Engaging the fingers 22 with lip 40 while the fingers 22 are in their stressed state creates a frictional interface between the fingers 22 and lip 40. In this manner, the arm 12 is attached to spacer 30 of actuator assembly 10.

In the embodiment shown, lip 40 of spacer 30 is annular in shape, and thus the outer perimeter of lip 40 has a first radius $r_1$. The fingers 22 are sized and shaped to engage the perimeter of the lip 40 of spacer 30 along at least a length of fingers 22. In the embodiment shown, fingers 22 are curved to form a circular, "C" shaped opening 24 having a radius $r_2$, with the radius $r_2$ of opening 24 being less than the radius $r_1$ of the outer perimeter of lip 40. Fingers 22 are expanded into the stressed state and positioned about lip 40 so that opening 24 receives lip 40, and the fingers are released so that the fingers 22 engage the perimeter of lip 40. Because the radius $r_2$ of opening 24 is smaller than the radius $r_1$ of the outer perimeter of lip 40, the fingers 22 are retained in the stressed state when they engage lip 40, and thus a frictional clamping force between fingers 22 and lip 40 is created. While an annular lip 40 and curved fingers 22 are shown, other shapes can be used for lip 40 and fingers 22. For example, lip 40 can be shaped to be an ellipse or any combination of curved and linear segments, as may be desired, with fingers 22 being shaped along at least a portion of the fingers to correspond to the shape of lip 40.

To better secure the arm 12 to spacer 30, lip 40 and at least one of fingers 22 can include mating structure having an interlocking geometry to provide additional engagement between the lip 40 and arm 12. In the embodiment shown, lip 40 includes a first detent 42 and a second detent 44 formed in the outer perimeter of lip 40. Detents 42 and 44 are semi circular in shape, and extend vertically from a top portion of lip 40 to the bottom of lip 40 (i.e. down to the planar surface 34 of flange 32). Each of the fingers 22 are formed to have an engagement member at the proximal end of each finger 22. In the embodiment shown, the engagement member of fingers 22 is an enlarged tip 23 at the proximal end of each finger 22. That is, as compared to a first width $w_1$ of the fingers 22 measured just distal of the proximal end of the fingers 22, each finger 22 includes a tip 23 having a second width $w_2$ that is greater than the first width $w_1$ of fingers 22. In the embodiment shown, tips 23 are circular as viewed from the top of arm 12, and thus have a diameter that is greater than the first width $w_1$ of fingers 22. Tips 23 can be spherical, and thus extend above and/or below the plane of arm 12, or tips 23 can be substantially planar with arm 12 to have a flat top and bottom surface with a thickness substantially the same as that of fingers 22 (i.e. tips 23 can be disk shaped) as desired.

The radius of curvature of the semi-circular detents 42 and 44 and the radius of the circular tips 23 are sized to be substantially the same, and the detents 42 and 44 are positioned on the perimeter of lip 40 in such a manner that, when the fingers 22 engage lip 40, the tips 23 of each finger 22 are positioned in and mate with the detents 42 and 44. That is, the detents 42 and 44 and tips 23 of fingers 22 are sized, shaped, and positioned such that tips 23 interlock with the detents 42 and 44 of lip 40. Interlocking tips 23 of fingers 22 with detents 42 and 44 formed in the perimeter of lip 40 provide an attachment force between spacer 30 and arm 12 in addition to the frictional interface between the fingers 22 and perimeter of lip 40 described above. Other shapes for the interlocking mating structure can also be used. For example, the detents 42 and 44 could be square shaped, with tips 23 also be square shaped to engage and interlock with detents 42 and 44.

Figure 10:
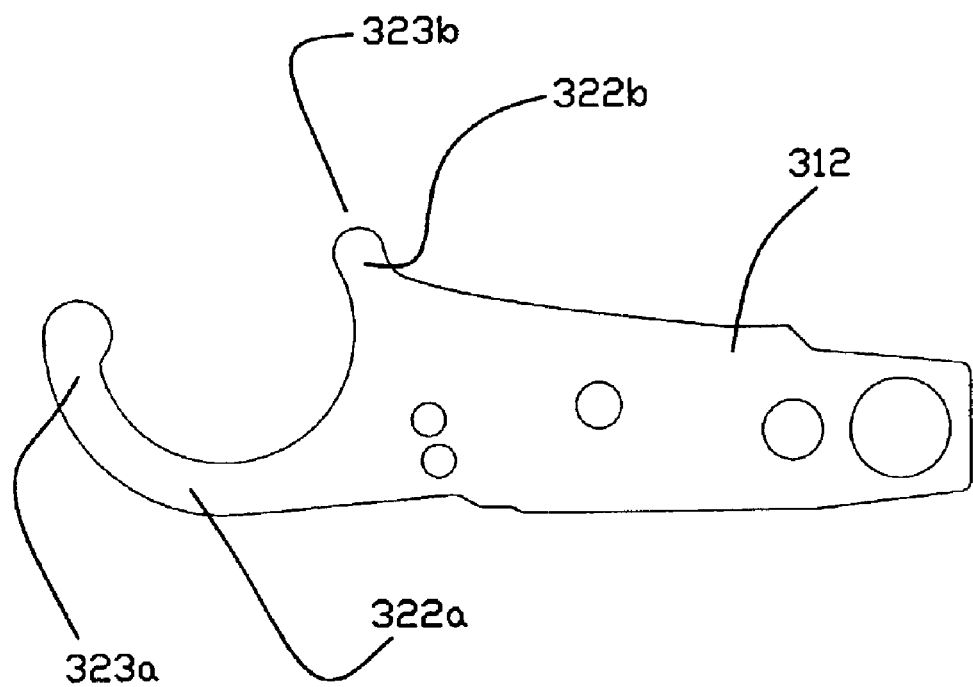
FIG. 10 is a top plan view of an alternative arm useful in the actuator assembly of the present invention.

FIG. 10 shows an alternative embodiment of an arm 312 wherein only one finger 322a includes an interlocking tip 323a. That is, a first finger 322a includes a circular tip 323a of material that has a width that is greater than the nominal width of finger 322a. Second finger 322b, on the other hand, is formed to have a tip 323b with a width that is substantially the same as the nominal width of finger 322b. Tip 323a interlocks with a detent of a lip of a spacer in an actuator assembly in the manner described above. While the embodiment of the present invention shown in FIGS. 2–7 and described above utilizes engagement members at the proximal end of both resilient fingers of an arm, an arm having a single engagement member such as is shown in FIG. 10 advantageously provides additional mounting force between an arm and a spacer, and is within the spirit and scope of the present invention.

As perhaps best shown in FIGS. 3–6, spacer 30 and arm 12 of actuator assembly 10 can also include structure that helps to properly align arm 12 on spacer 30 as arm 12 is attached to spacer 30. Flange 32 of spacer 30 includes a slot 33 that extends from the perimeter of flange 32 radially inward toward the apertures 36 and 42 of spacer 30. In the embodiment shown, arm 12 has a boss tower 25 that extends from surface 12b (i.e. the surface facing an associated disk in a disk drive) of the arm 12. The boss tower 25 is adapted to fit into and traverse the guide slot 33 as arm 12 is mounted to spacer 30. The boss tower could also thus be formed in the opposite surface of arm 12, depending upon the orientation between spacer 30 and arm 12.

More specifically, the guide slot 33 is preferably curved, and the slot 33 and boss tower 25 are engaged during the mounting of arm 12 to spacer 30, which aids in the attachment of fingers 22 to lip 40. A first tip 23 of fingers 22 can be placed into detent 42. Guide slot 33 and boss tower 25 are positioned so that the boss tower enters slot 33 at the perimeter edge of flange 32. The other tip 23 rests against the perimeter of lip 40. The arm 12 is then rotated, with boss tower 25 traversing slot 33 along the curvature of slot 33. As arm 12 is rotated, the other tip 23 traverses the perimeter of lip 40, and is expanded so that lip 40 fills opening 24. The other tip 23 engages and mates with detent 44 in lip 40. In this manner, slot 33 helps to expand fingers 22 and properly align arm 12 with spacer 30 as arm 12 is mounted to spacer 30.

In the embodiment shown in FIG. 2, the stacked array of arms 12 of actuator assembly 10 is formed in such a manner that a single arm 12a is attached to spacer 30a, while a pair of arms 12b and 12c are attached to spacer 30b. The height of lip 40 of a spacer 30 thus must be controlled to accommodate either a single or a pair of arms 12 as may be desired. That is, the height of the lip of spacer 30a is preferably sized to be less than or equal to the first thickness of fingers 22 of arm 12a. In an embodiment where a boss tower is included on arm 12a and a guide slot is included on spacer 30a, the height of the boss tower is preferably less than or equal to the thickness of flange 32 of spacer 30a. In this manner, when arm 12a is mounted to spacer 30a, the lip of spacer 30a does not extend above the top surface of the arm 12a, and the boss tower does not extend below the bottom surface of flange 32 of spacer 30a.

Similarly, the height of the lip of spacer 30b is sized to be sufficiently high to permit the fingers of both arms 12b and 12c to be mounted to the lip of the spacer. The height of the lip of spacer 30b is thus preferably sized to be more than the thickness of the fingers of one of the arms 12b and 12c but less than sum of the thickness of the fingers of both arms 12b and 12c. In the embodiment shown, the fingers of arms 12b and 12c are controlled to have the same first thickness, although arms having different thickness could be used, with the height of the lip of the spacer to which the arms are attached being controlled as necessary to be less than the sum of the arms' thicknesses. In this manner, the lip of the spacer 30b does not extend above the bottom surface of the arm 12b.

Such a configuration wherein the spacers of a stacked array are sized so that the spacer lip remain at or below the surface of the one or more arms attached to the lip permits the arms of the stacked array to be more closely fit together since height allowances for the lip 40 are not needed. In embodiments where guide slots and boss towers are used to facilitate the mounting of arms to spacers, controlling the height of the boss tower in the manner described above similarly permits the arms of the stacked array to be more closely fit together since height allowances for the boss tower are not needed.

In addition, an actuator assembly 10 in accordance with the present invention advantageously provides an accurate means for aligning the head suspensions and head sliders at the proper vertical height in the actuator assembly. Conventional actuator assemblies having a spring arm mount, such as are disclosed in U.S. Pat. No. 5,631,789 described above, can utilize actuator arms that engage a groove machined into an actuator assembly. Manufacturing tolerances in the formation of the grooves on the assembly can lead to errors in the Z-height alignment of the actuator arms, and thus in the Z-height alignment of the head suspensions and the head sliders.

The present invention overcomes such a shortcoming since the arms 12 of actuator assembly 10 are not attached to spindle 20, but instead are mounted to spacers 30. That is, by accurately forming the flange 32 of spacer 30 to a desired thickness, the stacked array of arms 12 of actuator assembly can be accurately assembled to position the individual arms 12 at the proper Z-height.

Moreover, the present invention helps to reduce stackup tolerances in a stacked array of arms 12 in an actuator assembly 10, particularly in comparison to conventional arms mounted to grooves formed in an actuator. The present invention also helps to provide adequate frictional forces for securing the arms in the actuator assembly because clamping takes place directly on an arm surface.

Actuator assembly 10 also advantageously provides for the selective reworking of one or more head suspensions attached to the arms 12 in an efficient manner without disassembling the entire stacked array of arms 12. If one of the head suspensions and/or head sliders in the stacked array were to fail, the nut 18 can be loosened to remove the axial compressive force on actuator assembly 10 that secures the spacers 30 to spindle 20. The spacer to which the failed head suspension of arm 12 is attached can then be rotated out of alignment with the remainder of the stacked array, which permits the arm 12 to be grasped and removed from the spacer 30, and thus the actuator assembly 10. A new arm 12 having a functioning head suspension can then be mounted to the spacer 30 in the manner described above, and the arm 12 and spacer 30 can be rotated back into alignment with the remainder of the stacked array. The nut 18 can then be retightened to secure the spacers 30 to spindle 20.

The present invention permits this selective reworking of one or more individual arms 12 in the stacked array in a more efficient manner as compared to conventional actuator assemblies having a stacked arm configuration. In an actuator assembly wherein individual head suspensions are swaged to arms of an actuator E-block, it can be difficult to reverse the swaging process to remove a failed head suspension, particularly without damaging surrounding head suspensions in the stacked array. In an actuator assembly wherein an actuator spindle is inserted through an aperture on a proximal end of a plurality of arm/head suspension combinations, the stacked array must be disassembled down to the level of the failed head suspension to permit the suspension to be replaced. In an actuator assembly wherein a plurality of arms/head suspensions each have spring arms that engage a groove machined into an actuator assembly, it can be difficult to grasp the failed head suspension due to the close spacing between individual arms in the stacked array. The present invention overcomes each of these shortcomings in that a failed arm/head suspension can be rotated out of the stacked array to permit the arm to be reworked as necessary without damaging surrounding arms in the array.

Figure 8:
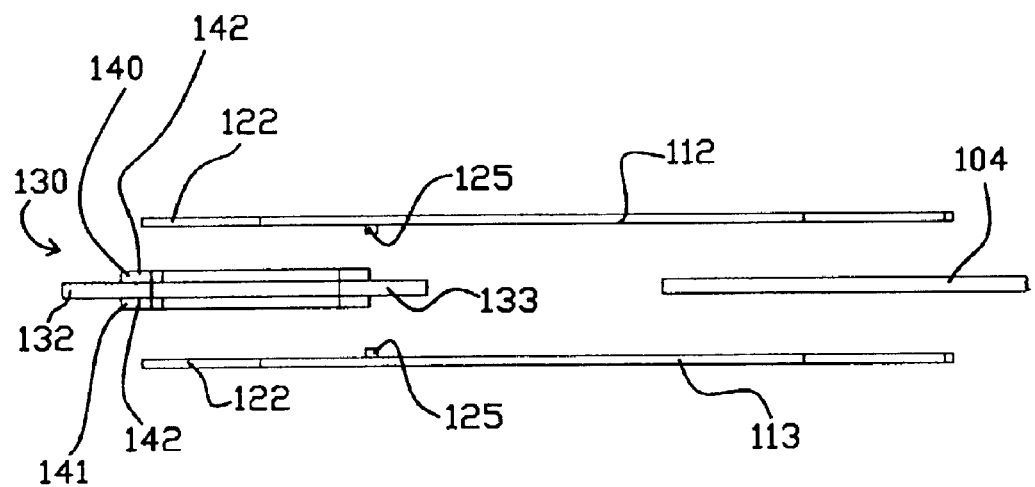
FIG. 8 is an exploded side view of a portion of a second embodiment of a stacked array of an actuator assembly in accordance with the present invention.

FIG. 8 shows an alternative spacer 130 useful in an actuator assembly in accordance with the present invention. Spacer 130 includes a flange 132 having an upper surface and a lower surface, with an upper lip 140 extending form the upper surface and a lower lip 141 extending from the lower surface. Spacer 130 includes an aperture 143 that extends through upper lip 140, flange 132, and lower lip 141. A pair of arms 112 and 113 are mounted to spacer 130, with arm 112 mounted to upper lip 140 and arm 113 is mounted to lower lip 141. Arms 112 and 113 each include resilient fingers 122 (only one of which can be seen) at the proximal end of the arms, with the fingers 122 being expanded from a neutral state to a stressed state to mount the arms 112 and 113 to spacer 130. Lips 140 and 141 can each include first detent 142 and second detent 144, with detents 142 and 144 being engaged and interlocked with engagement members on the proximal tips of the fingers 122 of arms 112 and 113 in the manner described above.

Spacer 130 and arms 112 and 113 can be incorporated into a stacked array of arms in an actuator assembly. In the embodiment shown, arms 112 and 113 are arranged on either side of a disk 104 interposed between the arms. As with the spacer and arm described above, the height of lips 140 and 141 are preferably equal to or slightly less than the thickness of the respective arm 112 and 113. In such an embodiment, the spacing between arms 112 and 113 necessary to accommodate disk 104 can be controlled by forming the flange 132 of spacer 130 with an appropriate thickness.

Figure 9:
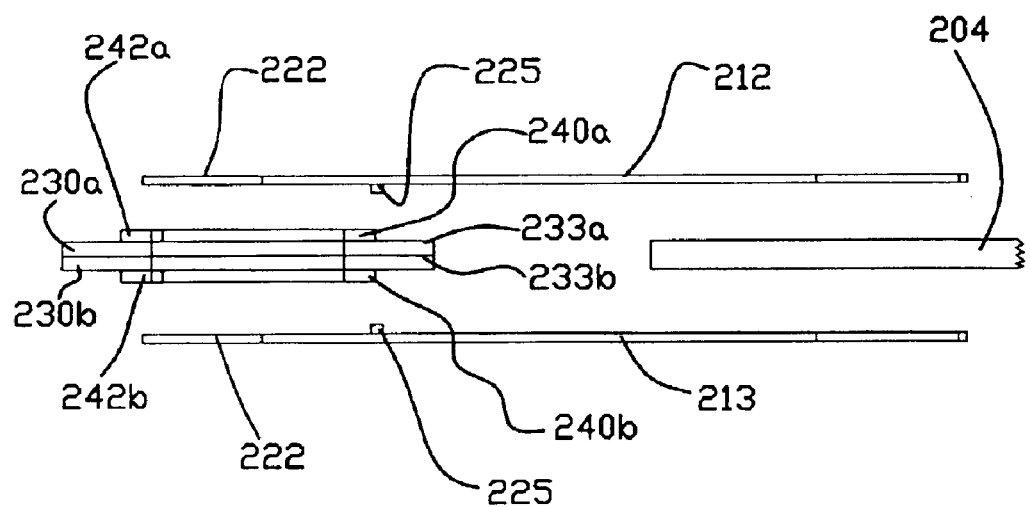
FIG. 9 is an exploded side view of a portion of a third embodiment of a stacked array of an actuator assembly in accordance with the present invention.

FIG. 9 shows an alternative embodiment of spacers 230 and arms 212 and 213 useful in an actuator assembly in accordance with the present invention. First spacer 230a and second spacer 230b are arranged back to back, with lip 240a of spacer 230a extending up and lip 240b of spacer 240b extending down. Arm 212 is mounted to lip 240a, while arm 213 is mounted to lip 240b, and spacers 230a and 230b and arms 212 and 213 can include mounting structure described above, including resilient fingers at the proximal ends of the arms 212 and 213 that engage the lips 240a and 240b of spacers 230a and 230b, respectively. The lips 240a and 240b can include first and second detents on the perimeter of the lips, while one or both of the proximal tips of the fingers of arms 212 and 213 can include engagement members that engage and interlock with the first and second detents of the spacer lips, as is described above. A disk 204 can be interposed between the arms 212 and 213, with the interdisk spacing between arms 212 and 213 being controlled by the thickness of the flange 232a and flange 232b. Back to back spacers and associated arms mounted to the spacers can be used in a stacked array of arms in an actuator assembly.

Moreover, while the embodiments of the actuator assembly of the present invention have been shown and described having a stacked array of arms configured to position a head suspension over opposing sides of a plurality of disks in an information storage device, any number of arm/disk configurations can be provided. For example, a single spacer to which a single arm is attached can be provided for accessing a single side of a disk in an information storage device. Similarly, a spacer having a lip sized to accommodate a pair of arms mounted to the lip can be positioned between a pair of disks so that the head suspensions attached to the arms each access one side of the disks. Additional spacers and arms can be configured to position a head suspension over the opposite surfaces of the disks.

Although the present invention has been described with reference to preferred embodiments, those skilled in the art will recognize that changes may be made in form and detail without departing from the spirit and scope of the invention.

What is claimed is:

1. A method for mounting an arm to an actuator, comprising the steps of:
    providing an actuator assembly having at least one spacer and at least one arm,
        the spacer having an annularly shaped lip with first radius extending from a planar surface of the spacer, the lip having a different cross-sectional area than the planar surface of the spacer from which the lip extends, and at least a first detent formed in a perimeter edge of the lip and a reference location diametrically opposed from the center of the detent, and
        the arm having first and second resilient fingers at a proximal end of the arm, the fingers having inner surfaces that define a substantially annularly shaped opening between the first and second fingers, the annularly shaped opening having a second radius that is less than the first radius and at least the first finger having an engagement member extending from the inner surface into the annularly shaped opening;

positioning the arm to locate the engagement member of the first finger within the first detent; and rotating the arm about the engagement member and toward the lip while the engagement member is within the first detent to expand the first and second resilient fingers from a neutral state and to engage the first and second fingers in a stressed state with the lip and with the second finger extending beyond the reference location to mount the arm to the lip.

2. The method of claim 1, wherein:

the lip of the spacer includes a second detent formed in a perimeter edge of the lip;

the second finger includes an engagement member at the proximal end, and the step of rotating the arm includes rotating the arm until the engagement member of the second finger engages with the second detent of the lip of the spacer.

3. The method of claim 2, wherein:

the spacer includes a flange having a guide slot extending from a perimeter of the flange radially inward;

the arm includes a boss tower extending from a surface of the arm; and the step of rotating the arm about the engagement member further includes, rotating the engagement member and toward the lip, so that the boss tower of the arm traverses the de slot of the spacer.

4. The method of claim 2, wherein the first detent and second detent are formed in the lip of the spacer so that the are not aligned on a common diameter of the spacer.

5. The method of claim 1, wherein the first and second resilient fingers are asymmetrical.

* * * * *

UNITED STATES PATENT AND TRADEMARK OFFICE
CERTIFICATE OF CORRECTION

PATENT NO. : 6,941,641 B2
DATED : September 13, 2005
INVENTOR(S) : Shane J. Van Sloun It is certified that error appears in the above-identified patent and that said Letters Patent is hereby corrected as shown below:

Column 12,
Line 12, delete "de" and insert therefor -- guide --.
Line 15, delete the second occurrence of "the" and insert therefor -- they --.

Signed and Sealed this

Thirteenth Day of December, 2005

JON W. DUDAS
*Director of the United States Patent and Trademark Office*